Nov. 1, 1938.                J. YOXALL                 2,135,246
                        VARIABLE SPEED GEARING
                        Filed May 13, 1936           4 Sheets-Sheet 1

INVENTOR
J. Yoxall
BY
E. H. Wendroth
ATTORNEY

Nov. 1, 1938.   J. YOXALL   2,135,246
VARIABLE SPEED GEARING
Filed May 13, 1936   4 Sheets-Sheet 2

INVENTOR
J. Yoxall
BY
E. F. Wendroth
ATTORNEY

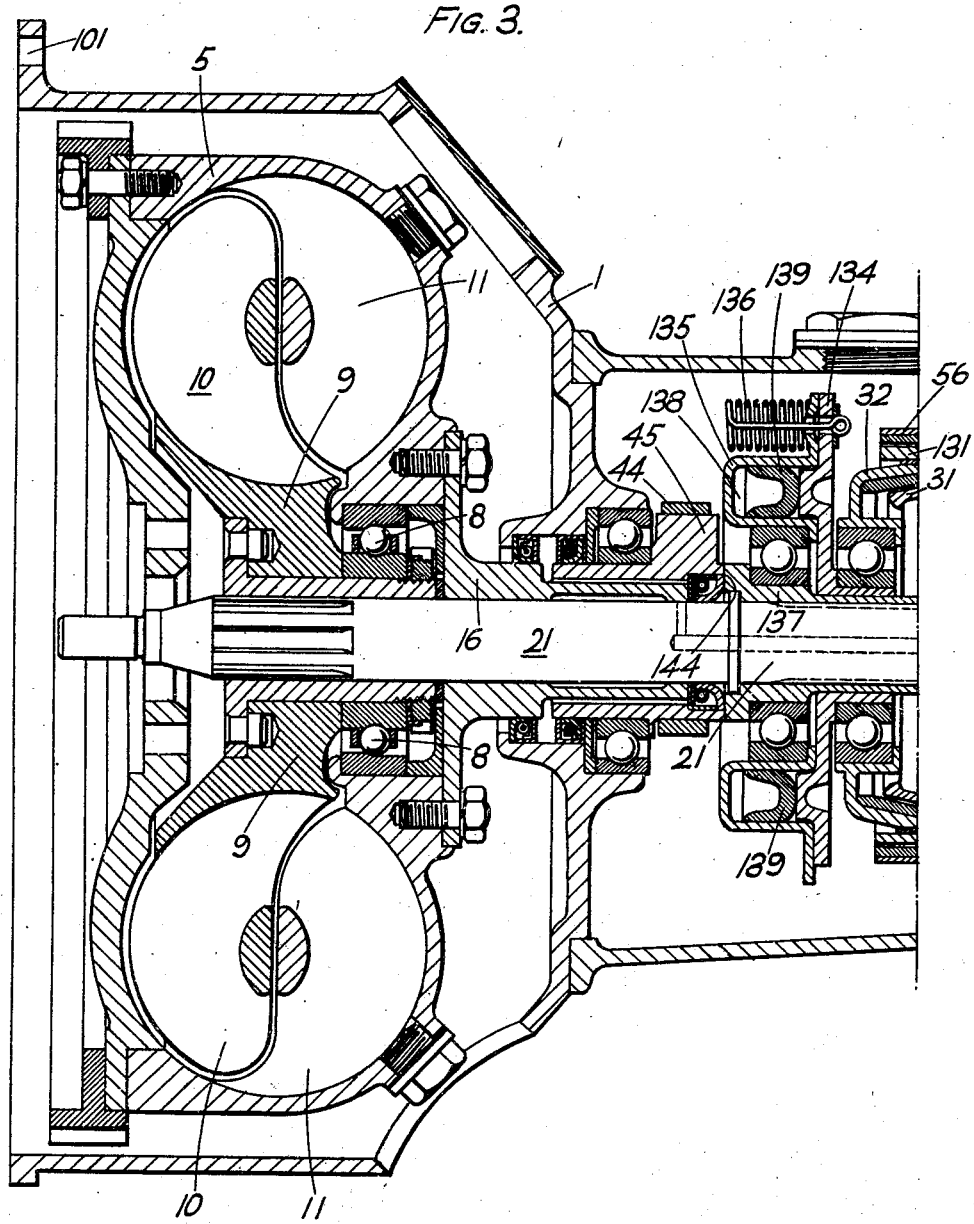

Nov. 1, 1938.  J. YOXALL  2,135,246
VARIABLE SPEED GEARING
Filed May 13, 1936  4 Sheets-Sheet 4

INVENTOR
J. Yoxall
BY
ATTORNEY

Patented Nov. 1, 1938

2,135,246

UNITED STATES PATENT OFFICE 2,135,246

VARIABLE SPEED GEARING

Joseph Yoxall, Deganwy, North Wales, assignor to Propello Inventions Limited, London, England, a British company Application May 13, 1936, Serial No. 79,555 In Great Britain May 15, 1935

6 Claims. (Cl. 74—189.5)

The present invention relates to variable-speed transmission gears for use in automobiles.

It is the chief object of the present invention to provide a variable-speed transmission gear which comprises an input shaft, an output shaft, a hydraulic coupling having an element connected to said input shaft, a series of compounded epicyclic trains and means for connecting (and disconnecting) members of one of said trains to (and from) an element of the hydraulic coupling so as to provide a "super-top" gear as between said input and output shafts.

A further object of the invention is to provide a transmission mechanism having an input shaft, a hydraulic coupling having an element connected to said input shaft, and an output shaft, and in which said hydraulic coupling is combined with a series of compounded epicyclic trains having means for connecting and disconnecting certain of said trains operatively with (and from) an element of said hydraulic coupling at will, and means for connecting one of said trains to another of the series so as to provide for and in addition to each of a plurality of normal gear ratios provided by the transmission a gear of slightly reduced gear-ratio as between said input and output shafts.

Another object of the invention is to provide a transmission mechanism comprising in combination an input shaft, an output shaft, a hydraulic coupling having an element connected to said input shaft, a series of compounded epicyclic trains, clutching means arranged between one of said trains and an element of the hydraulic coupling, and braking means applicable to an element of at least one train and to said clutching means.

In order that the present invention may be more fully understood the same will now be described with reference to the accompanying drawings which illustrate, by way of example, three embodiments of a power transmission in accordance with the invention, and in which:—

Figure 3 is a complete longitudinal sectional view of a preferred construction of transmission in accordance with the present invention;

Figure 1:
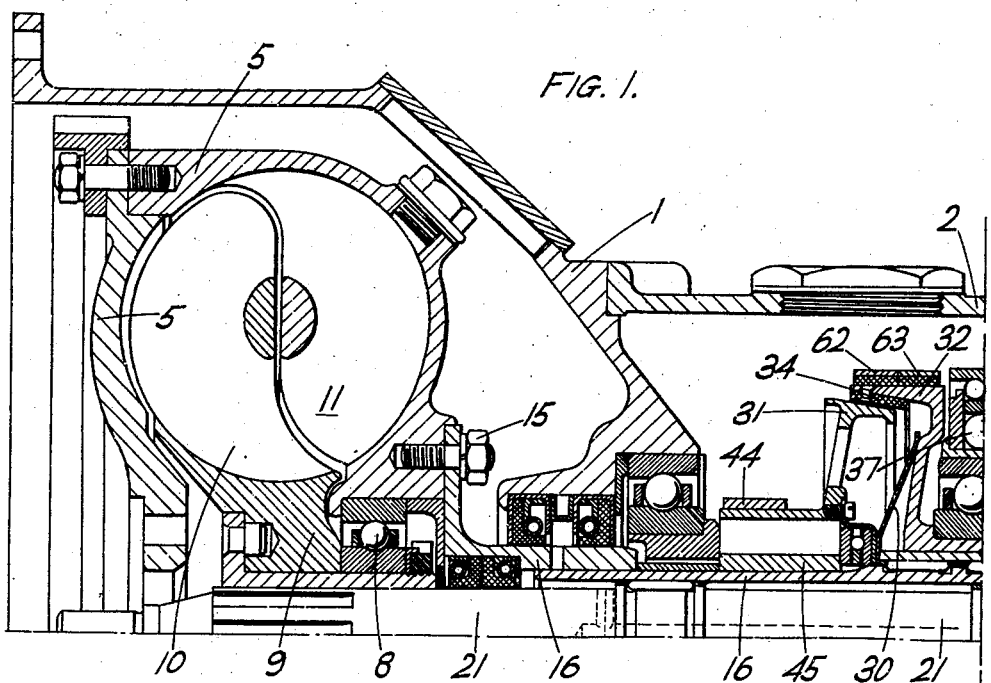
Figure 1 is a longitudinal sectional view of the upper half of one form of transmission incorporating an overdrive gear in accordance with the present invention.

The general construction of the transmission illustrated in the drawings hereto attached is similar to that of the transmission which is the subject of my pending patent application Serial No. 15,672, and may be regarded, from one aspect, as an improvement in that construction.

Referring now to Figure 1 of the attached drawings, the transmission mechanism, which is normally interposed between the engine crankshaft and a vehicle Cardan shaft to be driven, is housed within a casing formed in two sections, 1, 2. The front portion 1 of the casing is adapted to be held, as by means of bolts (not shown), to a wall of the engine casing, and the casing 1, 2, as a whole is secured to the vehicle chassis. Within the casing at its forward end is mounted the primary element 5 of a hydraulic coupling, which element is connected to an engine crankshaft by any suitable means, and is capable of rotary movement upon bearing 8. Within element 5, which is normally partially filled (e. g. to two-thirds of its capacity) with transmission fluid, such as a suitable oil, there is adapted to rotate the secondary element consisting of a circular hub member 9 carrying blades 10 adapted to co-operate with and be framed by webs 11 formed on the interior of element 5 to provide a fluid power-transmission unit, hereinafter referred to as the hydraulic coupling 5, 9. Desirably, the arrangement of webs 11 and blades 10 within the hydraulic coupling is such that when the secondary element 9 is in operative position within the primary element 5 (as shown) and in certain relative angular positions of said elements, at least one of the webs 11 frames a blade 10 with slight clearance along only one radial edge of said blade and along the whole or part of its tip and at least one of the blades is completely unframed by a web. Hub member 9 is keyed on to a shaft 21 which extends to the rear of the transmission mechanism as far as point 20, where it abuts against the output shaft 52 hereinafter referred to. Connected to element 5 by bolts 15 is a rearwardly extending sleeve member 16 which is in splined engagement with (I) an eccentric sheave 45 which serves for the operation of an eccentrically driven pump (not shown), (II) a clutch member 31, and (III) the planet pinion carrier 147 of the overdrive epicyclic train hereinafter described. The female clutch member 31 is adapted to co-operate with the male clutch member 32 constituted by an internally coned drum connected with the sunwheel 148 of the overdrive epicyclic train. Friction lining 34 is carried by member 32 to provide a gripping surface as between clutch members 31, 32. Portion 2 of the mechanism casing is provided, near to member 32, with an annular abutment 35 connected with a ring 36 adapted to co-operate with balls 37 which in turn co-operate with cam-slopes formed in an adjacent member to which a limited angular movement may be imparted by means including a piston movable within a cylinder (not shown) to which pressure-fluid can be admitted in a known manner under the control of the driver. Clutch member 32 is normally maintained out of engagement with member 31 by spring 30: admission of fluid to the cylinder above-mentioned, however, causes compression of the spring and engagement of clutch member 31, 32. As already explained, eccentric sheave 45 which rotates with member 16 (and consequently always rotates at engine speed) carries an eccentric strap 44 which operates, through a lever (not shown), pump pistons which supply pressure fluid to the transmission cylinders in the manner referred to in the above-mentioned prior patent application. As seen in Figure 1 of the drawings, there are provided four epicyclic trains forming a compounded series; for ease in reference, the permanent connections between the respective parts of these trains and other parts of the transmission mechanism are set forth in Table I below:

gear changes in the transmission mechanism by moving a single lever desirably mounted on the vehicle steering column, and that said lever is independent of other controls (such, for example, as the accelerator, or the brake pedal, or the customary clutch pedal—the latter being absent from the controls necessary for the transmission of the present invention).

The operation of the transmission mechanism shown in Figure 1 of the attached drawings for the various transmission speeds, is as follows:

*Neutral.*—With the engine idling, element 5 of the hydraulic coupling will rotate without inducing rotation of element 9: if the engine be speeded up so that element 9 tends to follow element 5, the motion of element 9 will be communicated to sunwheels 48, 51 and the motion of element 5 will be communicated to clutch member 31 and planet-carrier 147, but as, in the neutral position of the driver's control lever, clutch 31, 32, is disengaged and all the brakebands 56—63 are free, such motion becomes dissipated in idling movement of various of the gear members, and unconnected annulus 53 of the reverse gear train will absorb any motion transmitted to it through the compounded trains.

*First speed.*—Brake bands 58, 59, are applied

Table I

| Epicyclic train for— | Comprising these parts— | Connected respectively with these parts— | Controlled by— |
| --- | --- | --- | --- |
| Reverse gear | Annulus 53 | (Unconnected) | Brake bands 60, 61. |
| | Planet carrier 54 | Output shaft 52 | |
| | Sun wheel 55 | First speed annulus 49 | |
| | Planet pinions 67 | | |
| First speed | Annulus 49 | Reverse gear sun wheel 55, second speed planet carrier 47. | Brake bands 58, 59. |
| | Planet carrier 50 | Output shaft 52 | |
| | Sun wheel 51 | Second speed sun wheel 48, shaft 21. | |
| | Planet pinions 66 | | |
| Second speed | Annulus 33 | Overdrive annulus 133 | Brake bands 56, 57. |
| | Planet carrier 47 | First speed annulus 49 | |
| | Sun wheel 48 | First speed sun wheel 51, shaft 21 | |
| | Planet pinions 63′ | | |
| Overdrive gear | Annulus 133 | Second speed annulus 33 | (As for Second speed annulus). |
| | Planet carrier 147 | Clutch member 31, coupling element 5. | |
| | Sun wheel 148 | Clutch member 32 | |
| | Planet pinions 166 | | |

N. B.—Clutch member 31 is connected to overdrive planet carrier 147. Clutch member 32 is connected to overdrive sun wheel 148.

It is to be mentioned that the annulus of each of the four epicyclic trains referred to above is encircled by a pair of brake-bands which are normally slack thereon but are capable of being caused to grip the annulus when means under the control of the driver are suitably operated.

The general operation of the mechanism shown in Figure 1 of the attached drawings will now be described. To enable ready understanding of such operation, the transmission may be outlined as follows: The engine crankshaft is connected to the primary element 5 of the hydraulic coupling 5, 9, which is also connected permanently with member 31 of clutch 31, 32. The secondary element 9, of this coupling, is connected, through shaft 21 with the first speed and second speed sunwheels 51, 48. The overdrive sunwheel 148 is permanently connected with clutch member 32, and the application of clutch 31, 32 and of the brakebands controlling the four epicyclic trains are all under the driver's control through hydraulic means. It is further to be mentioned that the driver exercises control over on annulus 49. Element 5 drives element 9 which turns shaft 21, sun wheel 51 and pinions 66 to cause planet-carrier 50 to turn shaft 52 at a reduced speed.

*Second speed.*—Annulus 33 is held by brakebands 56, 57, and rotation of sun-wheel 48 by the engine (through coupling 5, 9, and shaft 21) causes planet carrier 47 to run forward carrying with it annulus 49 which rotates planet carrier 50 at a speed between that of annulus 49 and that of sun wheel 51, and output shaft 52 is rotated at this speed.

*Third (top) speed.*—Clutch 31, 32, is engaged thus connecting sun-wheel 148 to planet carrier 147, thereby locking the overdrive epicyclic train solid: the brake-bands 62, 63, which surround the clutch member 32, are released and annulus 33 is caused to rotate with element 5 of the coupling at engine speed. Simultaneously, part of the engine torque is transmitted by way of element 9 through shaft 21 to sun-wheels 48, 51, from sunwheel 48 it is transmitted to planet carrier 47 and annulus 49; from sunwheel 51 it is transmitted to pinions 66 and planet carrier 50 which is connected to output shaft 52. In this way a top-gear drive is effected from the engine through element 5 of the hydraulic coupling, and engine torque is transmitted through clutch 31, 32, being then shared between output shaft and element 9 of the hydraulic coupling, which tends to oppose motion of element 5 to a degree proportionate to the load. This, it will be realized, is equivalent to the engine torque being shared between elements 5 and 9 (as stated above) and being then transmitted by them to output shaft 52.

*Overdrive (super-top) gear.*—Sun-wheel 148 is held stationary by brake-bands 62, 63, and since the planet pinions 166 are driven with their carrier 147 by the engine, annulus 133 runs at a speed higher than engine speed, and conveys its motion to the integrally-formed annulus 33, whence an overdrive (or super-top) ratio drive is transmitted to shaft 52. The hydraulic coupling will behave in the same manner during overdrive gear as during top gear above described.

*Reverse gear.*—Brake-bands 60, 61, hold annulus 53 stationary. As in neutral, annulus 49 is caused to rotate, and in doing so, it rotates sun wheel 55 which in turn constrains planet carrier to turn, but in a direction opposite to that of shaft 21, thus imparting a low-gear reverse drive to output shaft 52.

With the above described mechanism an overdrive gear can be obtained at will with a relatively small complication in design of the mechanism as compared with that shown in the drawings of the above-mentioned patent application. The operation of the mechanism shown in Figure 1 has been described in detail, and for this reason it will now be possible to explain more concisely the alternative overdrive gear construction shown in Figure 2 of the attached drawings, and which is a logical development from that shown in Figure 1.

With the construction of Figure 1 it has been found that whenever the transmission mechanism is operating in first, second or neutral gears, the overdrive gear train is driven at an unduly high speed, producing unwanted noise and wear of the parts. The construction of Figure 2 eliminates this disadvantage, and involves the following changes, as compared with Figure 1: the overdrive epicyclic train, 133, 147, 148, 166, instead of being arranged at the forward end of the transmission and being formed as an extension of the second speed gear train, is inserted between the first and second gear trains, and forms an extension of the first gear train.

Figure 2:
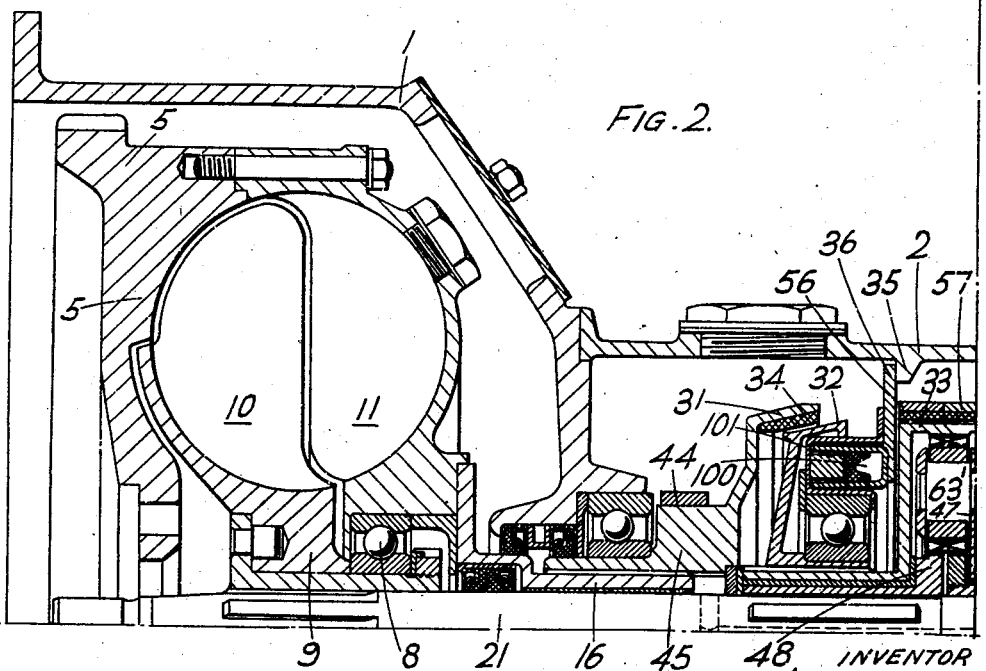
Figure 2 is a view similar to Figure 1 of a modified construction of the transmission shown therein.
Figure 1A:
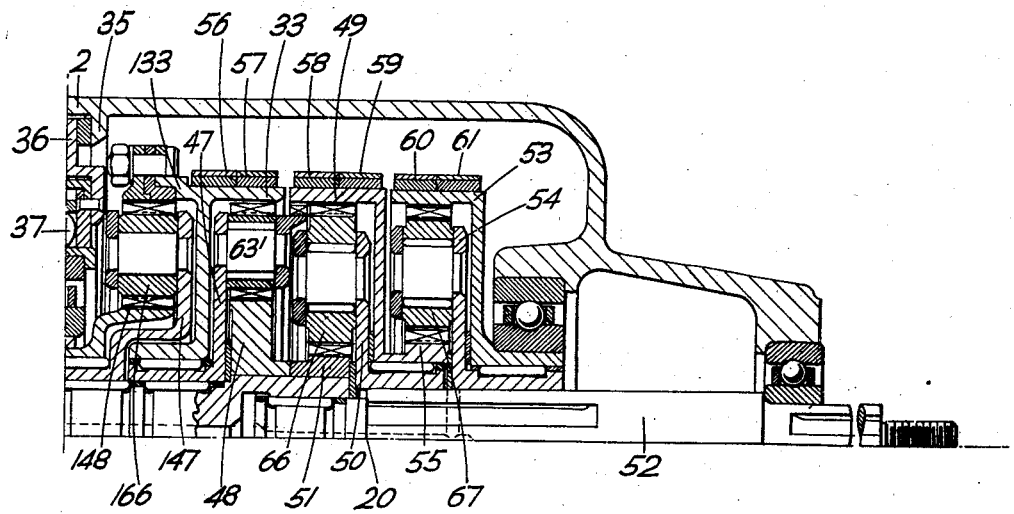
Figure 1a is a continuation to the right of Figure 1.
Figure 2A:
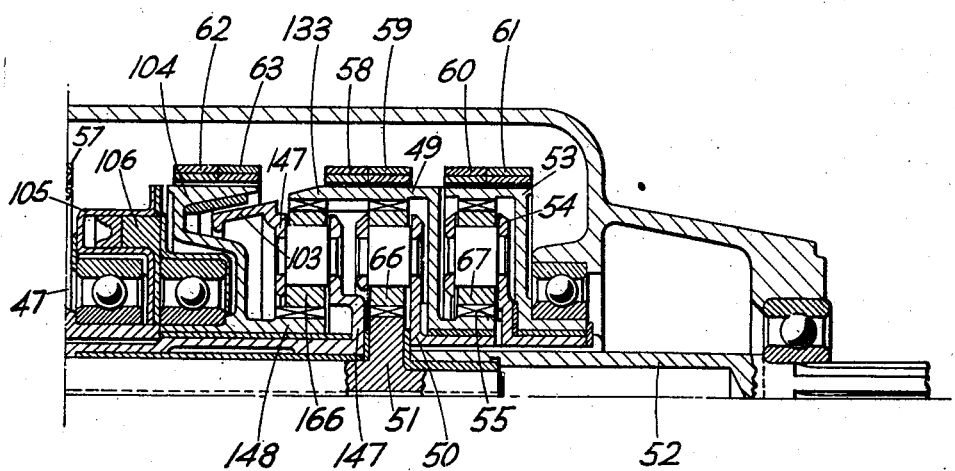
Figure 2a is a continuation to the right of Figure 2.

It will be seen from Figure 2 that clutch 31, 32, has been modified, as compared with that shown in Figure 1, by providing an annular channel 100, within which is slidable a plunger 101 by which, upon the introduction into channel 100 of pressure fluid under control of the driver), clutch element 32 (now reversed in form) is forced into clutching engagement with element 31, a spring (not shown) tending to separate the elements as before. The reverse gear train 53, 54, 55, 67, remains as in Figure 1: the first gear train now has its annulus 49 extended to form the annulus 133 for the overdrive train, the planet carrier 147 of the latter being formed at one side with an extension 103 clutchable to a slidable member 104 integral with sun-wheel 148 under the control of hydraulically operable means 105, 106, similar to 100, 101 referred to above. For convenience, the gear train parts of Figure 2 are set forth in Table II, below:

*Table II*

| Epicyclic train for— | Comprising these parts— | Connected respectively with these parts— | Controlled by— |
|---|---|---|---|
| Reverse gear | Annulus 53 | (Unconnected) | Brake bands 60, 61. |
|  | Planet carrier 54 | Output shaft 52 |  |
|  | Sun wheel 55 | First speed annulus 49 |  |
|  | Planet pinions 67 |  |  |
| First speed | Annulus 49 | Overdrive annulus 133, reverse gear sunwheel 55. | Brake bands 58, 59. |
|  | Planet carrier 50 | Output shaft 52 |  |
|  | Sun wheel 51 | Shaft 21 |  |
|  | Planet pinions 66 |  |  |
| Second speed | Annulus 33 | Clutch member 32 | Brake bands 56, 57. |
|  | Planet carrier 47 | Overdrive planet carrier 147 |  |
|  | Sunwheel 48 | Shaft 21 |  |
|  | Planet pinions 63' |  |  |
| Overdrive gear | Annulus 133 | First speed annulus 49 | (As for first speed annulus). |
|  | Planet carrier 147 | Clutch member 103, second speed planet carrier 47. |  |
|  | Sun wheel 148 | Clutch member 104 |  |
|  | Planet pinions 166 |  |  |

*N. B.*—Clutch member 31 is connected to coupling element 5. Clutch member 32 is connected to second speed annulus 33. Clutch member 103 is connected to overdrive annulus 147. Clutch member 104 is connected to overdrive sunwheel 148.

The operation of the mechanism shown in Figure 2 is as follows: the overdriving train 133, 147, 148 is arranged between the first and second speed trains (49, 50, 51; and 33, 47, 48). During direct drive the sun-wheel 148 of the overdriving train is clutched through members 103, 104, to the planet carrier 147 of the same train which thus rotates en bloc as does also the second speed train which is clutched solid through the hydraulic coupling 5, 9, by clutch members 31, 32. The power branches, part passing through the hydraulic coupling 5, 9, to shaft 21 and part passing through sleeve 16 to clutch 31 without passing through the coupling 5, 9. For overdrive the sun-wheel 148 is held fast by a brake 63 applied to drum 62.

It will be appreciated that by arranging the overdrive epicyclic train 133, 147, 148, 166 as an extension of the first gear train 49, 50, 51, 66, in the centre of the compounded epicyclic trains, and by providing clutches 103, 104, adjacent thereto, the said clutch being disengaged in all gears save overdrive gear, excessive speed of pinions 63' is avoided when reverse, first and second gears are engaged. In the construction of Figure 1, the compounded epicyclic trains for reverse, first and second gears are permanently connected so that when, for example, reverse gear is employed and brake bands 60, 61 are applied, motion of sunwheel 55 is transmitted to annulus 49 of the first gear train, from which said motion passes, greatly amplified in speed, to pinions 166, which although not under load (due to clutch 31, 32 being disengaged) are caused to rotate at an unduly high speed, and unwanted wear occurs in the gear parts concerned. When reverse gear is employed, however, in the construction of Figure 2, due to clutch 103, 104 being disengaged (except, of course, when overdrive gear is required), the motion of sunwheel 55 merely passes to annuli 49 and 133, whose motion is then dissipated between free planet carrier 147 and sunwheel 148 in inverse proportion to their respective inertiae; in these circumstances pinions 63' are not caused to rotate at an undue speed.

Figure 3A:
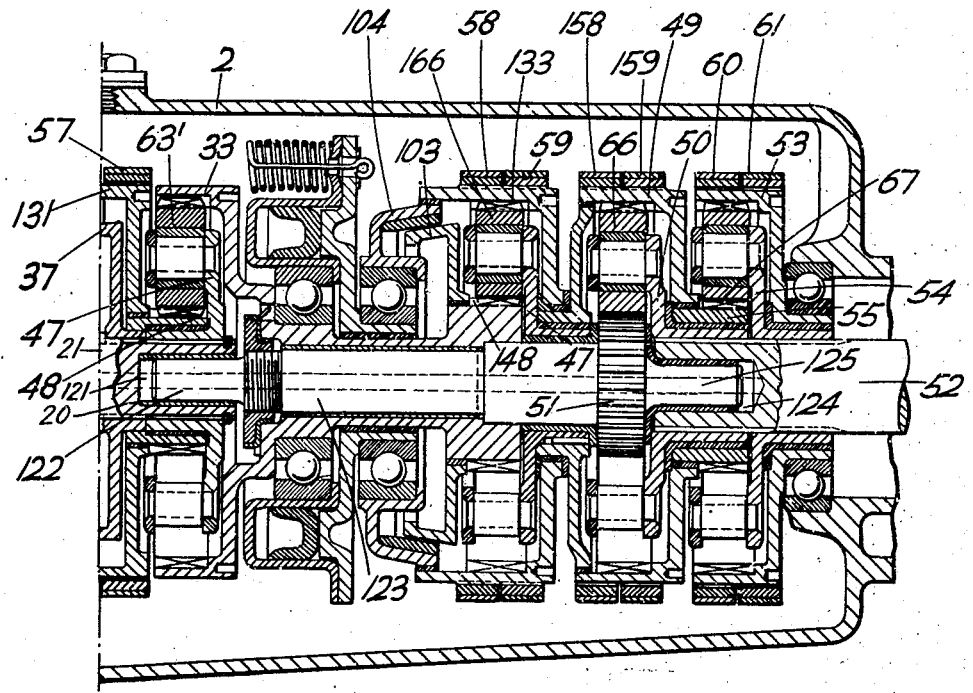
Figure 3a is a continuation to the right of Figure 3.

Coming now to a consideration of Figure 3 of the attached drawings, this figure illustrates a transmission mechanism which, from one aspect, is a further development of the construction shown in Figure 2. The construction shown in Figure 3 is distinctly preferred to those shown in the other figures, and the same will now be described together with the operation thereof.

The transmission mechanism shown in Figure 3 differs from those described above, in that both the hydraulic coupling and the machanical gearing are self-contained, and there is no branching of the power circuit; it is arranged to give six forward speeds and two reverse speeds. The mechanism is housed within a casing formed in two sections, 1, 2. The first portion 1 of the casing is adapted to be held by bolts (not shown) extending through bolt holes 101 to a wall of the engine casing, and the casing 1, 2, as a whole is secured to the vehicle chassis. Within the casing 1, at its forward end, is mounted the primary element 5 of a hydraulic coupling, which element is connected to the engine crankshaft by any suitable means and is capable of rotational movement upon bearings 8.

Within element 5, which is normally partially (e. g. two-thirds) filled with transmission fluid, such as a suitable oil, there is adapted to rotate a circular hub member 9 carrying blades 10 adapted to co-operate with and be framed by webs 11 formed on the interior of element 5 to provide a fluid power-transmission unit, hereinafter referred to as the hydraulic coupling 5, 9. Desirably, the arrangement of webs 11 and blades 10 within the hydraulic coupling is such that when the secondary element 9 is in operative position within the primary element 5 (as shown) and in certain relative angular positions of said elements, at least one of the webs 11 frames a blade 10 with slight clearance along only one radial edge of said blade and along the whole or part of its tip and at least one of the blades is completely unframed by a web. Hub member 9 is keyed on to a shaft 21 which extends toward the rear of the transmission mechanism as far as point 20, where it is formed with a hollow journal 121 into which is spigoted one end 122 of a layshaft 123 the other end 125 of which is spigoted into a similar journal 124 in the output shaft 52 hereinafter described.

Connected to element 5 by bolts 15 is a rearwardly extending sleeve member 16 which is in splined engagement with an eccentric sheave 45 which serves for the operation of a pump (not shown) through an eccentric strap 44: sleeve 16 terminates at point 144, so that primary element 5 of the hydraulic coupling 5, 9 is in no way directly connected with the rest of the transmission mechanism, its rotary motion being imparted solely to secondary element 9. Shaft 21, by which rotation of element 9 is transmitted to the transmission gearing is keyed (I) to one element 31 of a two-element clutch of which the other element 32 is slidably meshed with internal teeth on a drum 131 adapted to be braked at will by brakebands 56, 57, and (II) to the planet carrier 47 of the second speed epicyclic train, of which the sun-wheel 48 is connected to the drum 131, and the annulus 33 is keyed to lay-shaft 123 upon which are also keyed the sun-wheels 148 and 51, of overdrive and first speed gears respectively. Between the annulus 133 of the overdrive gear train, and sun-wheel 148 thereof is arranged a clutch, similar to clutch 31, 32, of which the inner member 103 is connected to sun-wheel 148 and the outer member 104 is slidably engaged with internal teeth formed on annulus 133, which latter is adapted to be braked at will by bands 58, 59.

Clutches 31, 32 and 103, 104 are each adapted to be actuated hydraulically under control of the driver: in the case of clutch 31, 32, a disc 134 is urged into contact with recessed plate 135 by means of spring 136 so that clutch element 32, which is slidable with plate 135 on a sleeve 137 carried by shaft 21, is normally out of engagement with element 31, but is adapted to be pushed into engagement whenever pressure fluid is admitted, under the driver's control, to recess 138 in plate 135 so as to cause a plunger collar 139 to move to the right. The operation of clutch 103, 104, is similar to that of clutch 31, 32.

In order that the interconnections of the various elements of the transmission mechanism shown in Figure 3 may be clear, they are set out in Table III, below:

Table III

| Epicyclic train for— | Comprising these parts— | Connected respectively with these parts— | Controlled by— |
|---|---|---|---|
| Reverse gear | Annulus 53 | (Unconnected) | Brake bands 60, 61. |
|  | Planet carrier 54 | First speed planet carrier 50, output shaft 52. |  |
|  | Sunwheel 55 | First speed annulus 49, overdrive planet carrier 147. |  |
|  | Planet pinions 67 | --- |  |
| First speed | Annulus 49 | Reverse sunwheel 55, overdrive planet carrier 147. | Brake bands 158, 159. |
|  | Planet carrier 50 | Output shaft 52, reverse gear planet carrier 54. |  |
|  | Sunwheel 51 | Layshaft 123, overdrive sunwheel 148, second speed annulus 33, clutch member 104. |  |

Table III—Continued

| Epicyclic train for— | Comprising these parts— | Connected respectively with these parts— | Controlled by— |
|---|---|---|---|
| Second speed | Annulus 33 | Layshaft 123, overdrive sun wheel 148, first speed sunwheel 51. | |
| | Planet carrier 47 | Secondary hydraulic element 9, shaft 21, clutch element 31. | |
| | Sunwheel 48 | Clutch element 32 | |
| | Planet pinions 63' | | |
| Overdrive gear | Annulus 133 | Clutch member 104 | Brake bands 58, 59. |
| | Planet carrier 147 | Shaft 52, first speed annulus 49, reverse sunwheel 55. | |
| | Sunwheel 148 | Layshaft 123, second speed annulus 33, first speed sunwheel 51, clutch member 103. | |
| | Planet pinions 166 | | |

N. B.—Clutch member 31 is connected to second speed planet carrier 47. Clutch member 32 is connected to second speed sunwheel 48. Clutch member 103 is connected to overdrive sunwheel 148. Clutch member 104 is connected to overdrive annulus 133.

The operation of the mechanism shown in Figure 3 is as follows:

*Neutral gear.*—With the engine idling and therefore only rotating primary element 5 slowly, no clutching effect is obtained as between elements 5 and 9 of the hydraulic coupling, and since only element 9 thereof is connected to the transmission gearing, no motion of the parts of the latter will occur. If now the engine be speeded up, fluid within coupling 5, 9, will gradually cause a clutching action between its elements, and rotary motion will be transmitted by element 9 through shaft 21 to (I) clutch member 31 and (II) second speed planet carrier 47; since in neutral gear all the clutches and all the brake-bands are disengaged, motion of shaft 21 will merely produce an idling motion of the second gear train and free parts connected therewith, no drive being communicated to output shaft 52.

*Low reverse gear.*—If now clutch 31, 32, be engaged and brake-bands 60, 61 applied, a drive will become effective from shaft 21, drum 131, the second gear train (rotating en bloc), and the first and reverse gear trains to shaft 52, such drive being of low gear and reversed direction to that of shaft 21.

*High reverse gear.*—Should a reverse gear be desired of slightly lower gear ratio than that given by low reverse gear just described, then it may be obtained by releasing clutch 31, 32 and in its place engaging clutch 103, 104: by doing this, the reverse gear train is overdriven through the overdrive gear train, the drive to shaft 52 passing through annulus 133 of the overdrive train instead of through the sunwheel 148, as occurs in low reverse gear.

*Low first gear.*—Clutch 31, 32 is now engaged and brake-bands 158, 159 alone are applied, whereby a forward low-gear drive is obtained to shaft 52 through the second, and first gear trains: since reverse gear brake-bands 60, 61 are now off, reverse gear annulus 53 is (in all gears save low reverse and high reverse) free to rotate idly, being unconnected with other gear parts.

*High first gear.*—Brake bands 56, 57 and 158, 159 are now applied and both clutches 31, 32, and 103, 104, being disengaged, a drive is transmitted from shaft 21 through gear members 47, 33, 123, 51, and 50 to driven shaft 52, and drive being of slightly lower gear ratio than that given by low first gear described above.

*Low second gear.*—Clutch 31, 32, is engaged and brake-bands 58, 59 are applied: a drive is then transmitted from coupling element 9 through members 21, 31, 32; 33, 47 and 48 en bloc; 148, 147, 49 and 51, 50; to output shaft 52.

*High second gear.*—Both clutches are disengaged and only brake-bands 56, 57 and 58, 59 are applied: a drive to shaft 52 is then transmitted by way of members 21, 47, 33, 148, 147, 50, 51, a slightly lower gear ratio being obtained than with low second gear.

*Top gear.*—With all brake-bands off, both clutches 31, 32 and 103, 104 are engaged. Under these conditions a drive is transmitted from shaft 21 through the second speed train (rotating en bloc) to the overdrive gear train (also rotating en bloc), thence through the first speed train (also en bloc) to output shaft 52. The gear ratio given by this drive is 1:1.

*Overdrive gear (or super-top).*—If now brake-bands 56, 57 are applied and clutch 103, 104 engaged, overdrive gear having a ratio less than 1:1 (i. e., a higher gear than top gear) will be in operation, the drive from shaft 21 to shaft 52 being then made by way of members 47, 33, overdrive train (rotating en bloc), and first gear train (also rotating en bloc).

It will then be seen that by overdriving each normal gear (e. g., low first, low second) a second set of gear ratios can be obtained at will. Since the application of the band-brakes and the engagement of clutches 31, 32, and 103, 104, is effected hydraulically (in the manner generally described in my patent application Ser. No. 15,672), the entire range of six forward speeds and two reverse speeds is obtainable by moving a single control lever (not shown), normally fitted on the vehicle steering column and under the driver's control. The construction illustrated in Figure 3 is such that, due to the provision of clutches 31, 32 and 103, 104 and to the fact that the latter clutch is only engaged during operation of the mechanism in top and overdrive gears, excessive speed of any of the planet pinions is avoided whilst the mechanism is operating in neutral, first, second or reverse gears: thus undue noise, and wear of the mechanism parts are avoided at all times.

Figure 4:
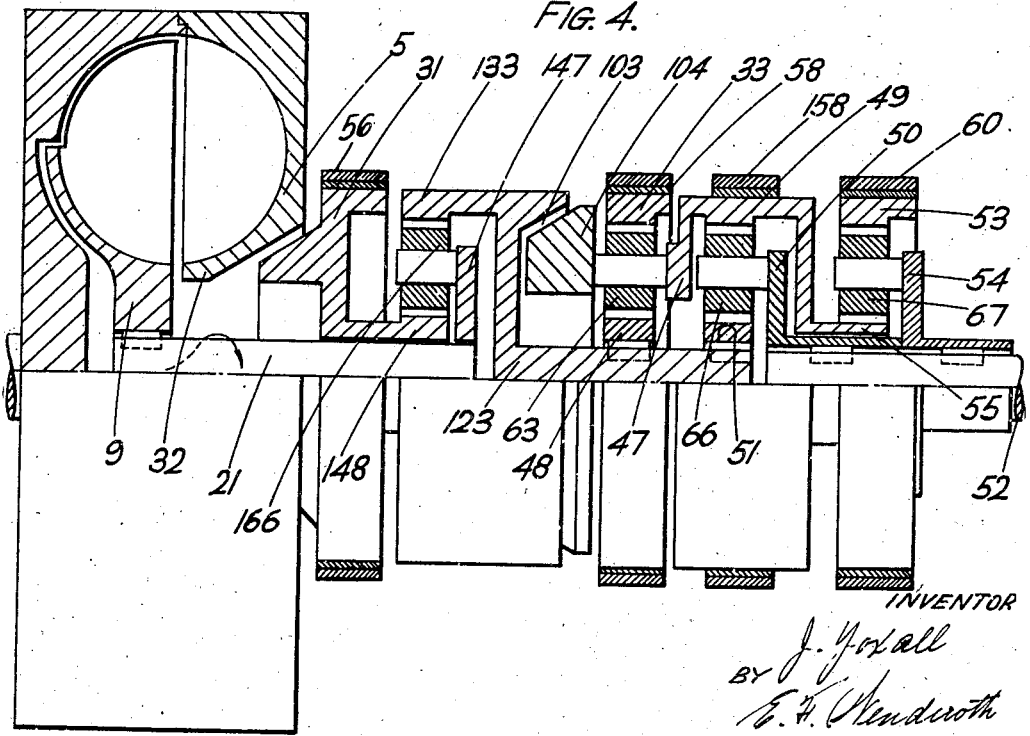
Figure 4 is a diagrammatic representation of an alternative construction of transmission to that shown in Figure 3.

Figure 4 of the attached drawings is a purely diagrammatic representation of an alternative construction of transmission mechanism to that shown in Figure 3: the construction of Figure 4 is not regarded as being quite so satisfactory as that of Figure 3, but it provides the same advantages of (I) super-gears (i. e. extra gears of lower gear ratio) for and in addition to each normal gear, (II) compactness, (III) freedom from undue noise and wear of parts, and (IV) ease of control, as the construction of Figure 3. Similar reference numerals indicate similar parts in each of Figures 3 and 4, and the operation of the construction illustrated in Figure 4 will be apparent upon consideration of Tables IV and V given below, having regard to the fact that such operation is similar to that of the construction shown in Figure 3 and described above:

Table IV

| In order to obtain the following gear— | The following control members are operated, viz.— |
|---|---|
| Neutral gear | All clutches and brake bands free. |
| Low reverse gear | Clutch 31, 32, engaged. Brake band 60, applied. |
| High reverse gear | Clutch 103, 104, engaged. Brake-band 60, applied. |
| Low first gear | Clutch 31, 32, engaged. Brake-band 158, applied. |
| High first gear | Brake-bands 56 and 158, applied. |
| Low second gear | Clutch 31, 32 engaged. Brake band 58, applied. |
| High second gear | Brake bands 56 and 58, applied. |
| Top gear | Clutches 31, 32 and 103, 104 engaged. |
| Overdrive gear | Clutch 103, 104 engaged. Brake-band 56, applied. |

Table V

| Epicyclic train for— | Comprising these parts— | Connected respectively with these parts— | Controlled by— |
|---|---|---|---|
| Reverse gear | Annulus 53 | (Unconnected) | Brakeband 60. |
| | Planet carrier 54 | Output shaft 52 | |
| | Sun wheel 55 | First speed annulus 49 | |
| | Planet pinions 67 | | |
| First speed | Annulus 49 | Reverse gear sun wheel 55 | Brakeband 158. |
| | Planet carrier 50 | Output shaft 52 | |
| | Sun wheel 51 | Layshaft 123 | |
| | Planet pinions 66 | | |
| Second speed | Annulus 33 | (Unconnected) | Brakeband 58. |
| | Planet carrier 47 | Clutch element 104 | |
| | Sun wheel 48 | Layshaft 123 | |
| | Planet pinions 63' | | |
| Overdrive gear | Annulus 133 | Clutch member 103 | |
| | Planet carrier 147 | Shaft 21 | |
| | Sun wheel 148 | Clutch member 31 | |
| | Planet pinions 166 | | |

*N. B.*—Clutch member 31 is connected to overdrive sun wheel 148. Clutch member 32 is connected to coupling member 5. Clutch member 103 is connected to overdrive annulus 133. Clutch member 104 is connected to second speed planet carrier 47.

It is to be observed that in the construction shown in Figure 4 the overdrive sun-wheel is adapted for connection at will with the driving member 5 of the hydraulic coupling. To effect this, sun-wheel 148 is connected by clutch 31, 32 to member 5 so that power passes to 148 without passing through the coupling. During direct drive there is a branching of the power circuit, part of the power passing through the coupling and through an intermediate shaft 21 to the planet carrier 147 of the overdrive train 133, 147, 148. The overdrive is thus imparted at will to a shaft 123 so that the overdrive and the direct drive can alternatively be combined at will with each of the reduced speeds obtainable by braking the first and second speed trains. The train 53, 54, 55 effects reversed driving of driven shaft 52 in combination with the first-speed train.

It is to be noted that in the construction shown in Figure 4 the primary element 5 of the hydraulic coupling 5, 9, is adapted to be clutched directly to overdrive the sunwheel 148, whilst secondary element 9 is permanently connected to shaft 21, as set forth in Table V above.

What I claim is:

1. Variable-speed transmission gear for automobiles comprising in combination an input shaft, an output shaft, a hydraulic coupling having an element connected to said input shaft, a series of compounded epicyclic trains, clutching means arranged between a pair of adjacent trains, a further clutching means arranged between a train and an element of the hydraulic coupling, and braking means applicable to an element of at least one train and to at least one of the clutching means.

2. A variable speed transmission gear comprising in combination an output shaft, an input shaft, a hydraulic coupling having an element connected to said input shaft, a series of compounded epicyclic trains, a clutch mechanism cooperating with an element of one of said trains and one of the elements of said hydraulic coupling and a second clutch mechanism cooperating between members of two adjacent trains, a layshaft located between said input and output shafts and having keyed thereto certain members of said trains and means for braking one of said clutch mechanisms.

3. A variable speed transmission gear comprising an input shaft, an output shaft, a hydraulic coupling having an element connected to said input shaft, a series of compounded epicyclic trains, a rotating clutch element, a cooperating clutch element connected to an element of one of said trains, means operable at the will of the operator for engaging said clutch elements to secure direct drive between said input and output shafts, braking means for said cooperating clutch element and means operable at the will of the operator for operating said braking means whereby a drive ratio greater than direct is secured.

4. A variable speed transmission gear comprising an input shaft, an output shaft, a hydraulic coupling having an element connected to said input shaft, a series of compounded epicyclic trains, means operable at the will of the operator for connecting an element of one of said trains to another element of one of said trains and means for braking said first mentioned element of one of said trains to secure a drive ratio greater than direct.

5. A variable speed transmission gear comprising an input shaft, an output shaft, a hydraulic coupling having an element connected to said input shaft, a series of compounded epicyclic trains, means operable at the will of the operator for connecting an element of one of said trains to an element of said coupling and means also operable at the will of the operator coacting with said element of one of said trains to effect a drive ratio between said input and output shafts greater than direct.

6. A variable speed transmission gear comprising an input shaft, an output shaft, a hydraulic coupling having an element connected to said input shaft, a series of compounded epicyclic trains, means operable at the will of the operator for connecting an element of one of said trains to an element of said coupling and means also operable at the will of the operator coacting with said element of one of said trains to effect a drive ratio between said input and output shafts greater than direct, and another element of said train of which one element is connectible to an element of said coupling being permanently connected to the other element of said coupling.

JOSEPH YOXALL.